(12) United States Patent  
Uhl

(10) Patent No.: US 7,936,502 B2
(45) Date of Patent: May 3, 2011

(54) MICROSCOPE

(75) Inventor: Rainer Uhl, Graefelfing (DE)

(73) Assignee: Till I.D. GmbH, Grafelfing (DE)

( * ) Notice: Subject to any disclaimer, the term of this patent is extended or adjusted under 35 U.S.C. 154(b) by 704 days.

(21) Appl. No.: 11/844,446

(22) Filed: Aug. 24, 2007

(65) Prior Publication Data

US 2008/0049310 A1    Feb. 28, 2008

(30) Foreign Application Priority Data

Aug. 25, 2006  (DE) .................. 10 2006 039 896

(51) Int. Cl.
*G02B 21/06* (2006.01)
(52) U.S. Cl. ........................................ 359/385; 359/368
(58) Field of Classification Search .................. 359/368, 359/385
See application file for complete search history.

(56) References Cited

U.S. PATENT DOCUMENTS

| 5,561,555 A * | 10/1996 | Meier et al. ................. 359/376 |
| 6,311,945 B1 | 11/2001 | D'Angelo |
| 2004/0023604 A1 * | 2/2004 | Busenhart ................. 451/64 |
| 2007/0153373 A1 | 7/2007 | Uhl |

FOREIGN PATENT DOCUMENTS

| DE | 103 28 308 A1 | 1/2005 |
| EP | 0 363 931 B1 | 10/1995 |
| GB | 2133901 A | 8/1984 |
| WO | 2004/077121 A1 | 9/2004 |
| WO | 2004/077123 A2 | 9/2004 |

* cited by examiner

*Primary Examiner* — Joshua L Pritchett
(74) *Attorney, Agent, or Firm* — Roberts Mlotkowski Safran & Cole, P.C.; David S. Safran

(57) ABSTRACT

A microscope device comprising a microscope objective and a plate-like body limited by a flat top face and a flat lower face essentially parallel thereto, with the microscope objective being connected to the plate-like body, and with a portion of a beam path of the microscope device extending above and/or below the plate-like body, wherein another portion of the beam path of the microscope device extends, essentially parallel to the top face and the lower face, within a recess within the plate-like body.

32 Claims, 4 Drawing Sheets

MICROSCOPE

BACKGROUND OF THE INVENTION

1. Field of the Invention

The present invention relates to a microscope device comprising a microscope objective and a plate-like body carrying the microscope objective.

2. Description of Related Art

Modern light microscopy requires more frequently illumination and imaging beam paths which are substantially more complex than that of a classical microscope support. Due to the constantly improving resolution of such microscopes, which nowadays extend by far beyond the limits of the light microscope described by Abbe, the requirements with regard to the mechanical stability of the optical arrangement is increasing. With advancing automation and acceleration of imaging the number of mechanical parts which have to be moved fast (for example the objective or the specimen holder) increases. If mechanical coupling of vibrations which disturb the measurement results is to be avoided, a mechanical stability and rigidity exceeding the presently realized degree by far, combined with a significantly extraordinary vibration damping, has to be ensured. Known microscope systems, such as the scanning laser microscope described in EP 0 363 931 B1, are arrangements on vibration-damped optical benches or so-called breadboards. However, in such known systems only a conventional microscope support is placed onto a vibration-damped bench. Such arrangement prevents the coupling of vibrations from the environment of the microscope; however, it does not prevent the coupling of vibrations which are generated in or at the microscope itself. For example, the movement of a movable stage supporting the microscope support may generate vibrations in the microscope support.

This problem becomes aggravated by the fact that conventional microscope supports in complex microscope systems only form a core element at which additional functional assemblies have to be fixed. Examples of such additional functional assemblies are laser scanning heads as used in confocal microscopy, micro-dissection devices or TIRF (Total Internal Reflection Fluorescence) coupling devices. Due to these fixed extensions the rigidity of the total system is reduced and the susceptibility to vibrations is increased.

U.S. Pat. No. 6,311,945 B1 relates to an optical bench, wherein a support plate 14 is suspended at a support frame via vibration isolators.

GB 2 133 901 A relates to an optical bench comprising a working plate mounted vertically on a support via an elastic member. The working plate is surrounded by a frame at which a movable screen is mounted for protecting optical elements mounted at the working plates from air flows, temperature fluctuations and acoustic noise.

It is an object of the invention to provide for a microscope device having a compact structure, wherein the necessary stability and rigidity is realized together with an improved vibration damping.

SUMMARY OF THE INVENTION

According to the invention, this object is achieved by a microscope device as defined in claim 1. A method for manufacturing of such a microscope device is defined in claim 32.

The invention is beneficial in that, with a preferably central portion of the microscope beam path being located in a recess within the plate-like body essentially parallel to the top face and the lower face of the body and with at least a further portion of the beam path being located above and/or below the plate-like body, an arrangement is achieved which provides for high stability and rigidity, together with high vibration damping, while in addition a very compact arrangement of the optical elements of the microscope is enabled. This platform structure allows for the integration of very different functional units and the production thereof in a unified manner.

The microscope objective may comprise an integrated tube lens or a tube lens may be provided in addition to the objective, with the tube lens likewise being connected to the plate-like body.

Preferably, the portion of the beam path of the microscope located above and/or below the plate-like body runs essentially parallel to the top face and the lower face. Beam deflection elements may be provided at the top face and/or the lower face and/or within the recess in order to provide for a connection between the different portions of the beam path and between the different planes of the beam path, respectively. According to a preferred embodiment the observation light impinges onto the specimen from the side facing away from the objective, and the light collected by the objective preferably is passed within the recess within the plate-like body to a detector which is arranged in the extension of this portion of the beam path.

Preferably a second detector, for example, for a different spectral range of the light collected by the microscope objective, is arranged in the portion of the beam path running above or below the plate-like body or in the extension thereof. A beam deflection element, which is either permanently located in the beam path in order to separate it into two beam paths (this occurs, for example, by using dichroitic beam splitters or polarisation cubes) or which may be brought optionally into the beam path in order to deflect the beam into a different plane, whereas the beam path remains in the same plane when the beam deflection element is not present, is used to ensure that the two detectors receive the light attributed to the respective detector.

The beam deflection element has to be exchangeable in order to be able to optionally place a beam deflection element into the beam path or to remove it from the beam path again, or in order to switch between beam splitters of different design. Preferably, this function is realized by mounting a plurality of beam deflection elements side by side on a linear slider, the sliding axis of which is located in a recess oriented perpendicular to the central optical axis of the microscope body.

Preferably the portion of the beam path located above and/or below the plate-like body also is used for coupling light from at least one epi-illumination light source into the microscope, with that portion of the beam path and the portion of the beam path guiding light to the second detector then being arranged opposite to each other at two different sides of the plate-like body in planes which are parallel to the top face and the lower face, respectively, of the plate-like body. Preferably, such an arrangement is symmetric with regard to that portion of the beam path which is located within the plate-like body essentially parallel to the top face and the lower face.

The combination and/or separation of the illumination beam path and the observation beam path preferably is realized by means of a selected beam deflection element which may be designed as a dichroitic long-pass in order to deflect illumination light essentially towards the microscope objective and to essentially transmit light collected by the microscope objective. However, also the reverse design, i.e. a dichroitic short-pass, is possible. Preferably, the selective beam deflection element is located within a recess in that portion of the beam path which located within the plate-like body essentially parallel to the top face and the lower face.

A further portion of the beam path of the microscope may be located in a further recess within the plate-like body essentially parallel to the top face and the lower face, wherein the portions of the beam path located in the interior of the plate-like body essentially parallel to the top face and the lower face may be arranged at an angle, preferably about 90°, relative to each other.

Preferably, the microscope objective is located above or below the plate-like body in an orientation essentially perpendicular to the top face and the lower face, respectively, of the body. Preferably the tube lens is located within a recess in that portion of the beam path which is located within the plate-like body essentially parallel to the top face and the lower face, so that the central optical axis of the microscope is located within the plate-like body. A beam deflection element may be located between the tube lens and the microscope objective above or below the microscope objective within that recess in that portion of the beam path located within the plate-like body essentially parallel to the top face and the lower face. The beam deflection element may be operable to control the deflection angle.

The plate-like body may be designed as a cuboid-like plate with two parallel plate surfaces, which are preferably formed by metal sheets between which a base body is located, wherein each recess for the portions of the beam path located within the plate-like body may be formed in the base body. Preferably, the base body is formed by casting, for example, mineral casting. Particularly simple manufacturing of such a cast base body can be achieved by casting around the recesses in the casting process so that there is no need for subsequent machining. Simultaneously, by using this manufacturing method, contact surfaces may be taken into account already during casting. Further, metallic anchor surfaces with bores, threads or insert nuts may be embedded with precise fit in the casting process.

The plate surfaces of the microscope body may support various optical elements, such as mirrors, prisms, beam splitters or optical deflection elements, which may be used for "compose" complex beam paths in the respective plane. These elements preferably are motor-driven and thereby allow for a flexibility of the beam path extending beyond the deflection into different planes. The planes include at least one plane within the microscope body, which includes a first optical axis of the microscope, and at least one further plane within one of the two half-spaces at both sides of the microscope body.

Preferably the plate-like microscope body is symmetric with regard to the central optical axis, so that an upright microscope or an inverted microscope may be constructed by using essentially the same elements. By assembling all relevant optical mechanical elements at a rigid base structure formed by the plate-like microscope body a mechanical rigidity is achieved which extends beyond that realized by the support concepts of the prior art. This benefit is particularly relevant for systems in which not only passive optical elements but also movable elements are fixed at or integrated within the rigid structure. Examples of such movable elements are a focussing drive of the objective, an x-y stage for the specimen, laser scanning devices as described, for example, in DE 103 28 308 A1, or dynamic beam deflection elements for e.g. selective illumination of a specimen with different light beam bundles as described, for example, in US 2007/0153373 A1.

Moreover, even the beam path of an illumination system as complex as a monochromator may be completely integrated within the plate-like microscope body.

As understood herein, "plate-like" bodies are bodies having a thickness which is not more than half of, preferably not more than one quarter of, the shortest dimension of the body in a direction perpendicular to the direction in which the thickness is measured (i.e. the width or the length of the body). The plate surfaces may be perforated by bores, etc.

"Essentially parallel" and "essentially perpendicular" as used herein includes deviations of not more than 5° from the orientation which is exactly parallel or exactly perpendicular, respectively.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1b is a perspective elevated view of the microscope device of FIG. 1a;

FIG. 3b is a perspective view of the microscope device of FIG. 3a; and

FIG. 3c is a partially transparent perspective view of the microscope device of FIG. 3a.

DETAILED DESCRIPTION OF THE INVENTION

Figure 1A:
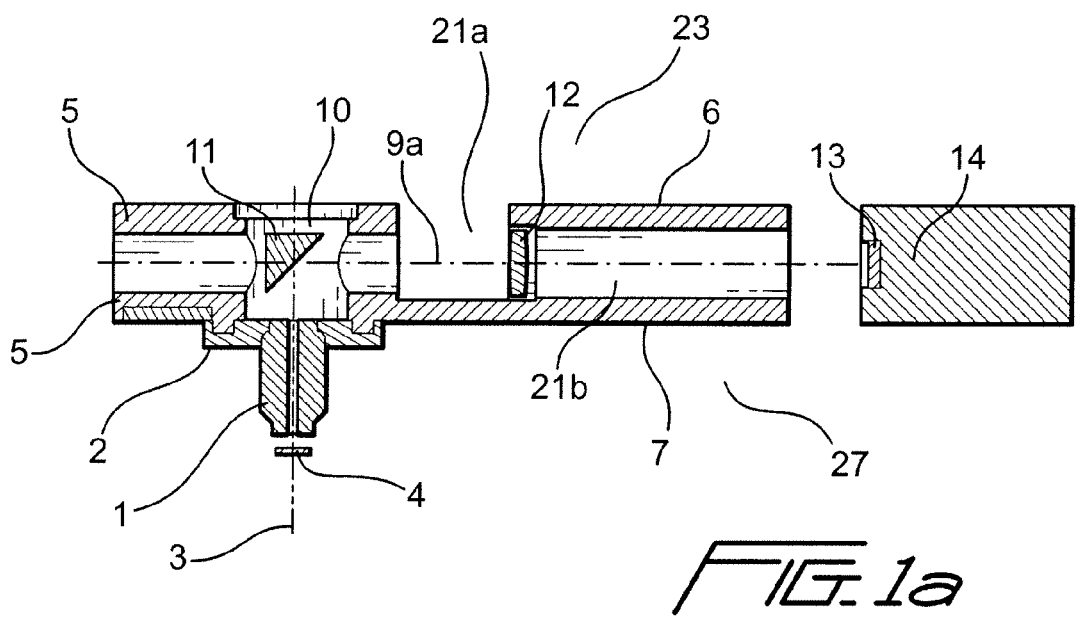
FIG. 1a is cross-sectional view of a first embodiment of an upright microscope device according to the invention along the line Ia-Ia of FIG. 1b.
Figure 1B:
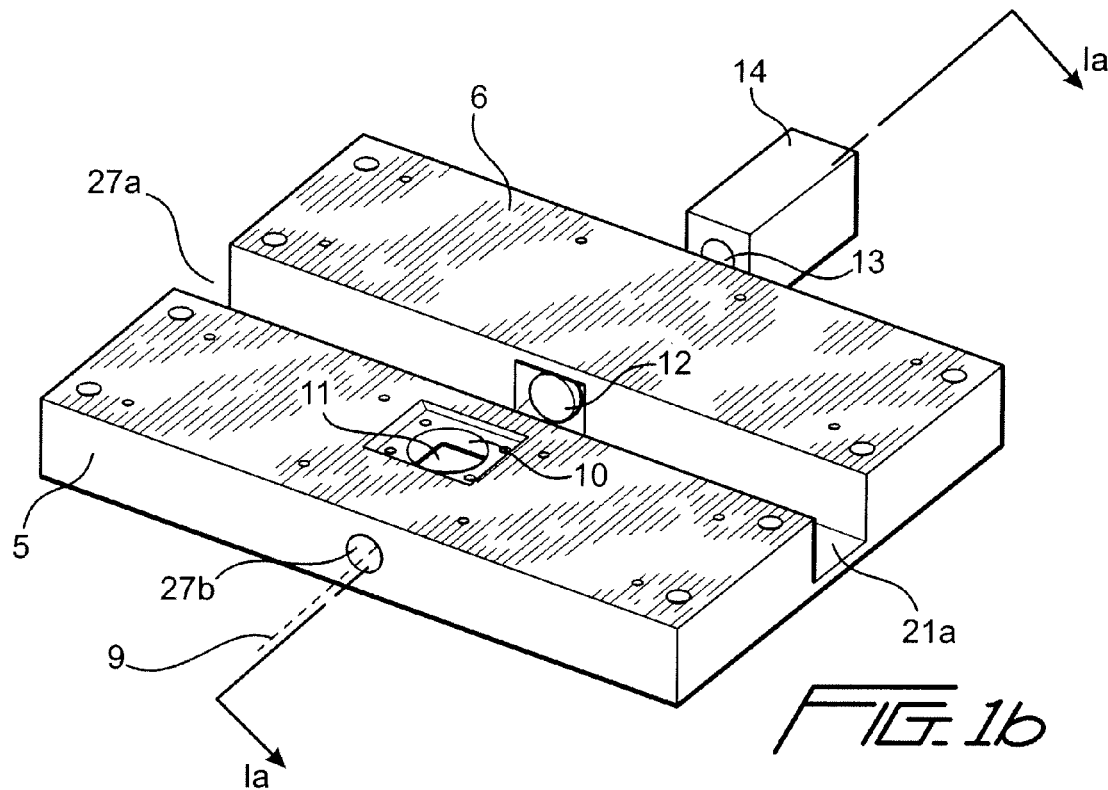
Figure 1C:
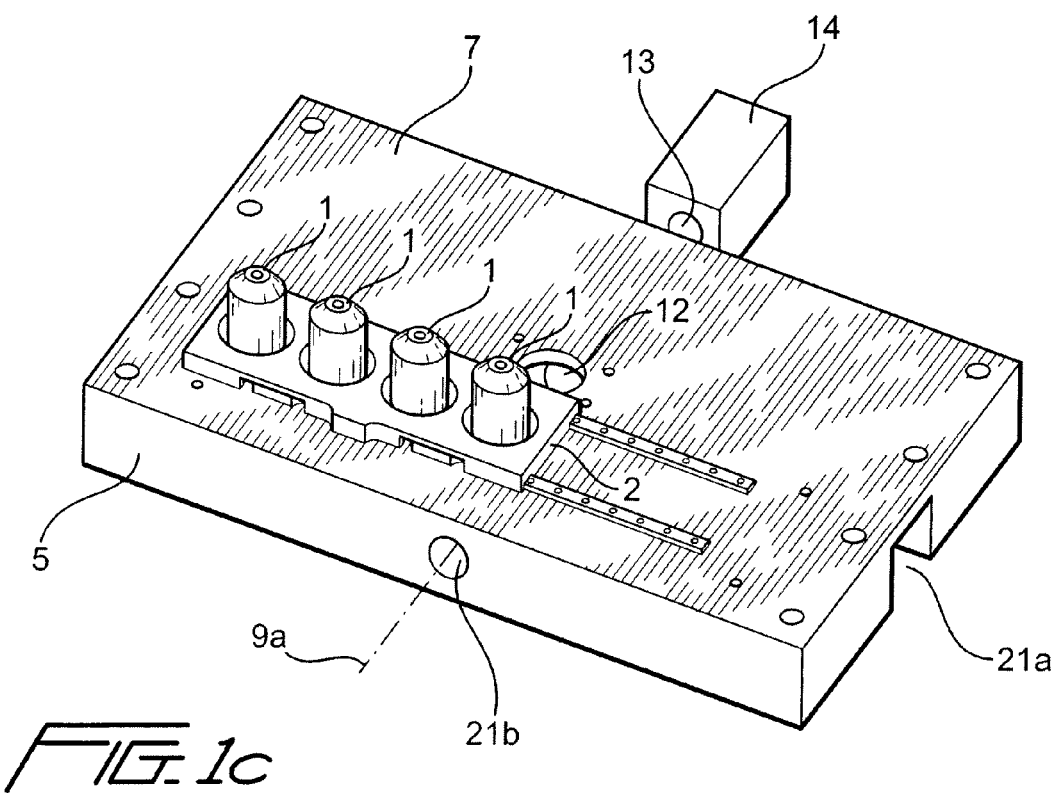
FIG. 1c is a perspective view of the microscope of FIG. 1a, seen from below.

FIGS. 1a to 1c show a preferred embodiment of a microscope device according to the invention in a cross-sectional view (FIG. 1a), in an elevated view (FIG. 1b) and in a view seen from below (FIG. 1c). The microscope device shown comprises four integrated objectives 1 in a suspended arrangement, i.e. with the objectives pointing downwardly. The objectives 1 are mounted on a linear sliding stage 2, and thereby the objectives 1 can be brought selectively into the optical beam path 3 of the microscope device and may be focussed with regard to a specimen 4. The sliding stage 2 is mounted at the lower face of a plate-like body 5 which is designed as an optical bench body. This plate-like body 5 is constructed like a vibration-damping optical bench (often also called "breadboard") in a deformation-resistant and vibration-damping manner. According to a particularly preferred embodiment of the invention the plate-like body comprises—as an alternative to known materials for optical benches, such as a sandwich construction made of metal comprising a honeycomb-like interior layer—a cast base body, for example, made of mineral casting, the benefits of which will be discussed in more detail below.

The plate-like body 5 comprises at its upper end and at its lower end parallel plate surfaces 6 and 7, which are precisely flat and which in addition may be covered by a metal skin (not shown in FIGS. 1 to 1c and designated by "8" in FIGS. 2a, 2b, 3a and 3b), so that the optical and mechanical functional elements can be fixed more easily. The plate-like body 5 further comprises a recess 21a and cylindrical or rectangular openings 21b and 10, which may serve to receive optical beams or to receive static or movable deflection elements. According to the example shown a central horizontal optical axis 9a extends coaxially within the opening 21b, and a further optical axis 3 of the microscope device extends within the vertical shaft 10. Deflection of a beam path of the microscope device from the central optical axis 9 into the vertical optical axis 3 extending through the microscope objective 1 is achieved by a beam deflection element 11. The deflection element 11 may be supported either in a fixed manner or in a movable manner. In the latter case the deflection element 11 is preferably mounted on a scanner actuator. The coupling of light for illumination of the specimen 4 will be explained below by reference to FIG. 2a.

Light which originates from the specimen 4 and which is collected by the microscope objective 1 is deflected by the deflection element 11 into the direction of the horizontal optical axis 9a and reaches an image sensor 13 located in the interior of a camera 14 via a focussing tube lens 12. Of course, this light may be analyzed in another manner, or the specimen 4 also may be directly observed via an eyepiece. A further deflection element, which preferably is capable of being exchanged in a motor-assisted manner, may be arranged within the recess 21a extending perpendicular with regard to central horizontal optical axis 9a and with regard to the optical axis 3 of the microscope device.

Figure 2A:
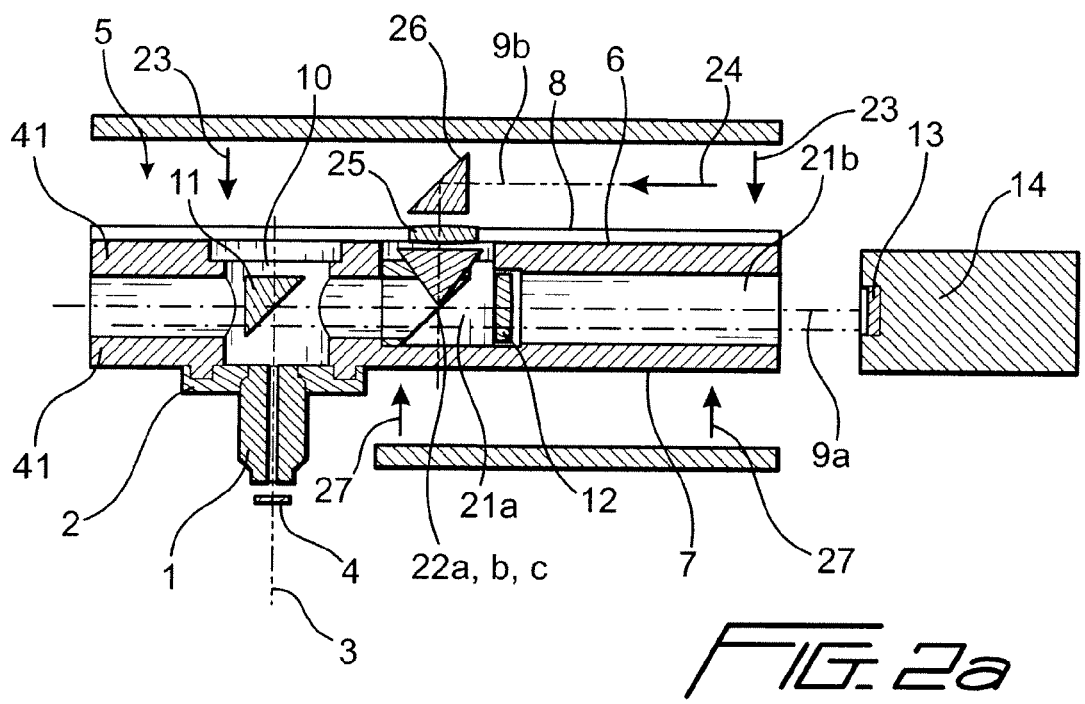
FIG. 2a is a cross-sectional view in the manner of FIG. 1a of another embodiment of a microscope device according to the invention.
Figure 2B:
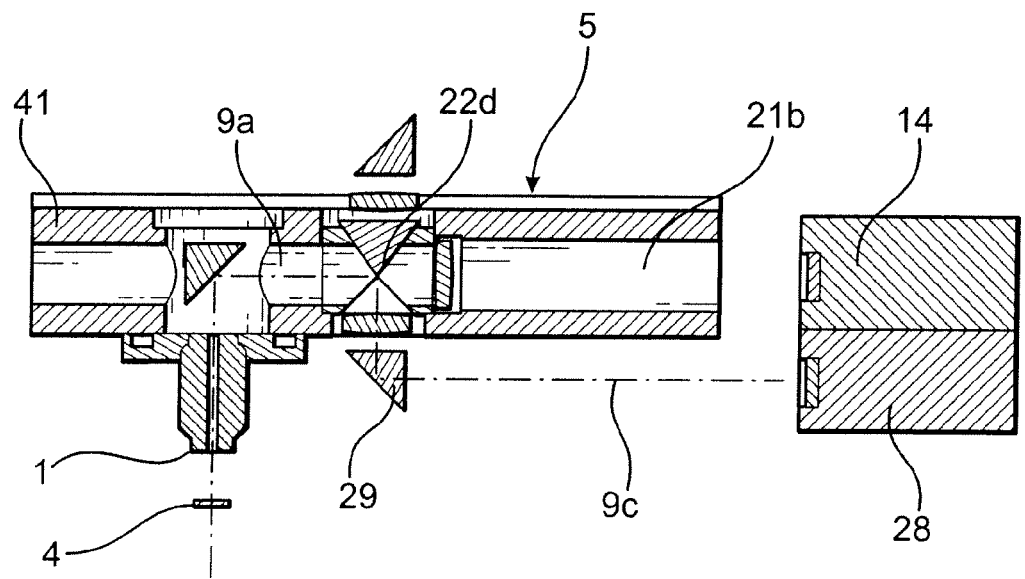
FIG. 2b is a cross-sectional view in the manner of FIG. 1a of a further embodiment of a microscope device according to the invention.

Two variants of this concept are shown in FIGS. 2a and 2b, respectively. According to FIG. 2a a plurality of selectable deflection elements 22a, 22b, 22c are provided in the recess 21a, which elements may be moved into the optical axis 9a of the microscope device in order to selectively deflect the beam path from the optical axis 9a of the microscope device, for example, into a direction upwardly out of the plate-like body 5. Such deflection may also occur depending on the wavelength or on the polarisation. Hence, a corresponding deflection element 22a, 22b or 22c acts as a selectively operable "beam multiplexer", as described in WO 2004/077121, in order to select a certain input and/or output beam direction. Preferably such deflection elements 22a to 22c are mounted directly on the metallic skin 8.

In FIG. 2b an example of a beam deflection element 22d is shown which deflects the beam path from the optical axis 9a into a downward direction.

By using such deflection elements 22a to 22d three spaces are opened for beam paths:

(1) The space in the interior of the body 5, which houses the tube lens 12. The primary camera 14, as shown in FIG. 1a, may be connected to the space in the interior of the body 5 (at the extension of the optical axis 9a beyond the cylindrical bore 21b), or the camera itself may be integrated within the interior of the body 5.

(2) The half-space 23 above the body 5. It may serve, for example, as shown in FIG. 2a for realizing the coupling of an epi-illumination beam path 24 along an optical axis 9b which, according to the embodiment shown here, is located in a plane parallel to the plate surface 6. According to FIG. 2a this is realized by a further tube lens 25 and an additional deflection element 26, which both are fixed, in turn, at the body 5.

(3) The half-space 27 below the base body 5. According to FIG. 2b this half-space 27 may serve to receive a second camera 28, for example, a color camera, in addition to the primary camera 14, which second camera 28 may be used alternatively.

An optimal utilization of the mechanical properties the plate-like body 5 is achieved by deflecting beams, which leave the plate-like body 5, into a direction parallel to the outer surfaces 6 and 7 of the plate-like body 5, for example, by the deflection element 26 (above) and 29 (below), respectively, shown in FIGS. 2a and 2b. According to the example shown in FIGS. 2a and 2b the beam paths located right of the deflection elements 26 and 29 (i.e. the epi-illumination beam path 24 and the beam path leading to the camera 28) are oriented horizontally. Of course, the entire microscope body 5 also may be oriented other than horizontally. With regard to this preferred embodiment of the invention it is only relevant that, by arranging the beams outside the plate-like body parallel to the surfaces 6 and 7 of the plate-like body 5, these areas above and below are available for optical assemblies. By arranging the beams close to the surfaces 6 and 7 of the plate-like body 5 and by fixing the required optical elements at these surfaces, the vibration damping property of the body 5 is optimally utilized. The deflection elements 26 and 29 may point into any direction parallel to the plate-like body 5, depending on whereto one wishes to direct the beam when seeking to achieve a maximally compact beam arrangement.

Figure 3A:
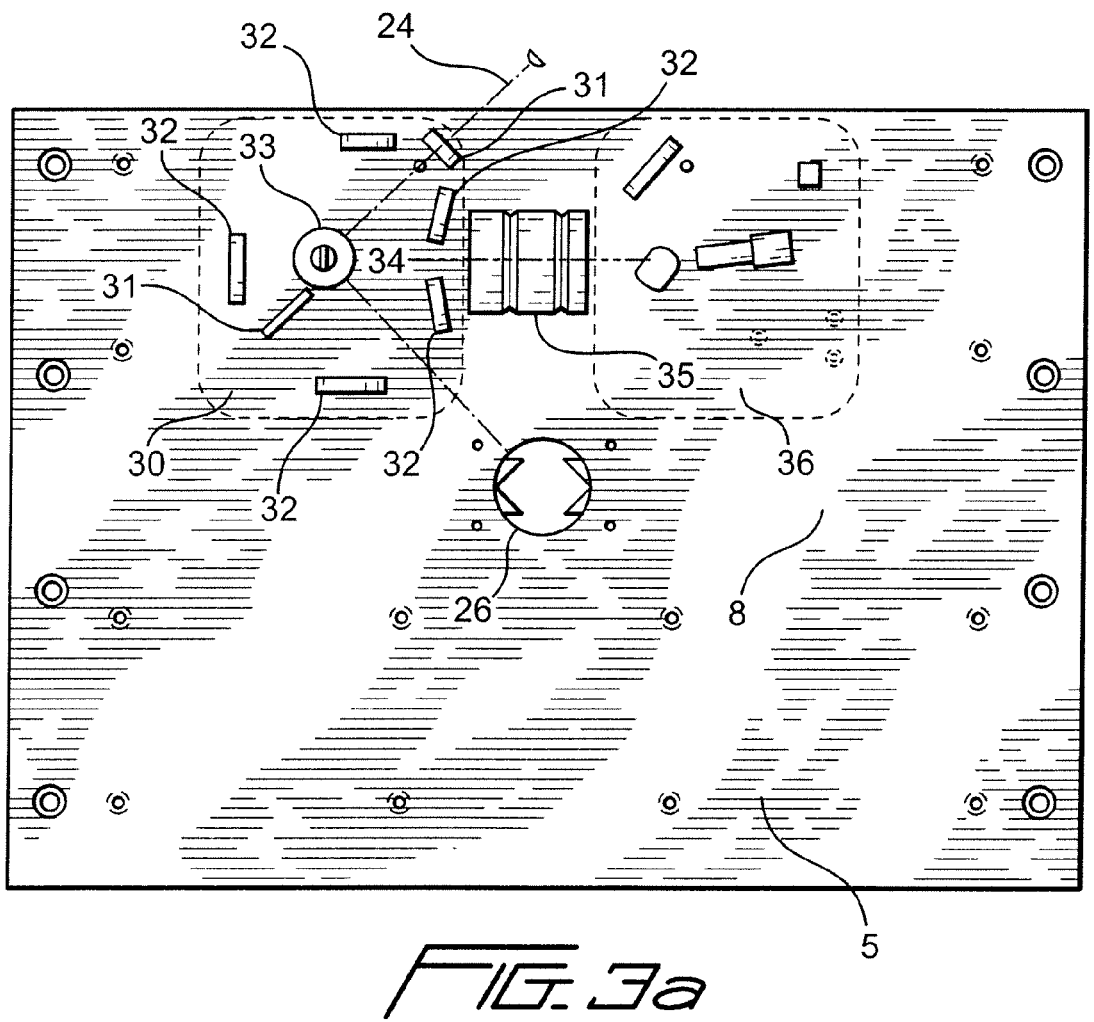
FIG. 3a is an elevated view of a still further embodiment of a microscope device according to the invention.
Figure 3B:
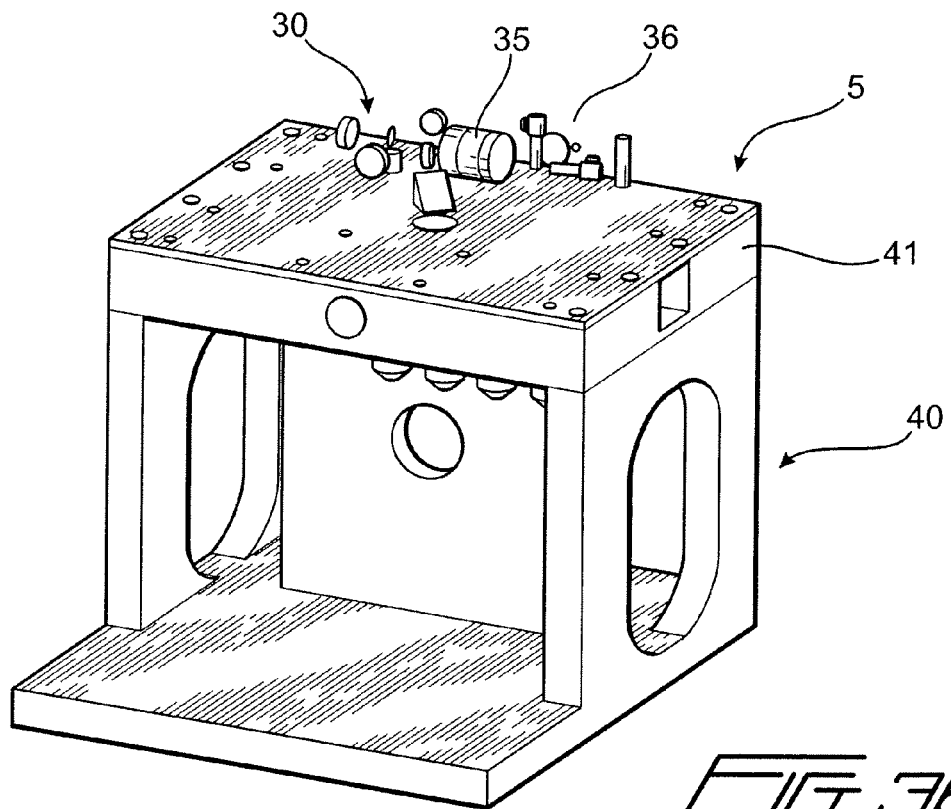
Figure 3C:
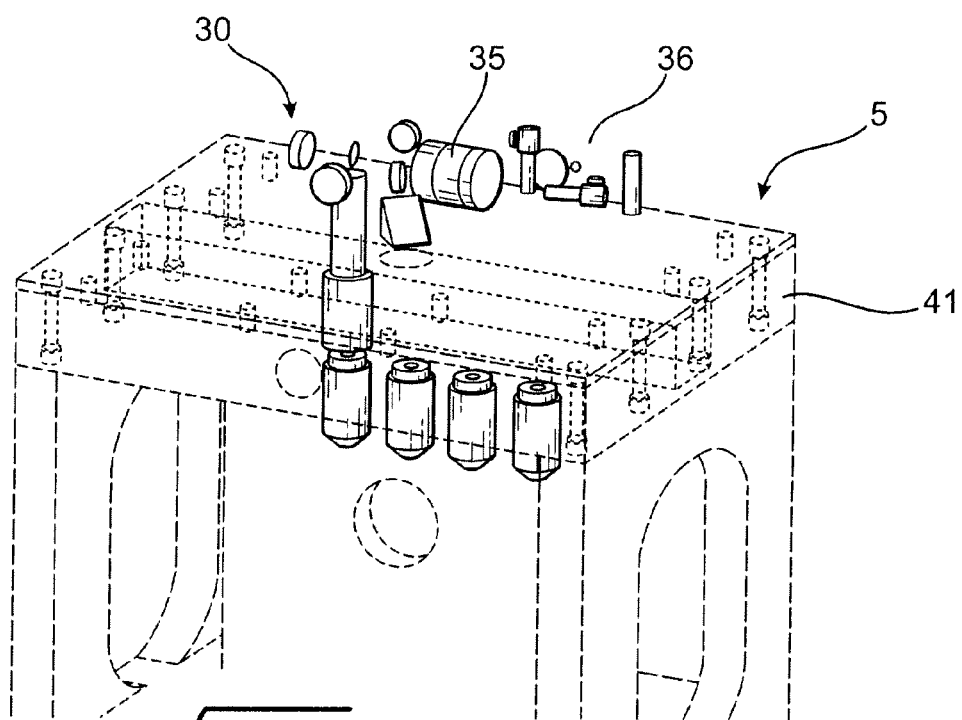

FIGS. 3a to 3c show a complete assembly 30 for selectively illuminating a sample with different light beam bundles, with the assembly essentially consisting of lenses 31, mirrors 32 and a scanning mirror 33, and being mounted at the surface of a plate-like body 5 which in turn is connected to a support 40. While FIG. 3a is an elevated view of the plate-like body 5, FIGS. 3b and 3c are perspective views of relevant parts of the setup, with the plate-like body 5 being shown in a semi-transparent fashion in FIG. 3c in order to more clearly illustrate the system.

Alternatively such an assembly 30 could be completely integrated within corresponding openings of the body 5 in the interior of the body 5.

By using such an assembly 30 with a microscope device according to the invention, different illumination modes may be realized. A first illumination variant is epi-fluorescence microscopy with wide-field illumination. To this end, the deflection elements 22a, 22b and 22c shown in FIG. 2a are designed as dichroitic splitters. They reflect short-wave excitation light originating from the half-space 23 above the base body 5 into the microscope device, and they allow the longer-wave emission light to reach the image sensor 13 of a monochromatic CCD camera 14 after having passed the tube lens 12. By utilizing the assembly 30, such epi-fluorescence measurements may be wide-field measurements, with the associated epi-illumination beam path 24 being selected according to FIG. 3a. Alternatively, the epi-fluorescence measurements also may be carried-out as a measurement of the evanescent light field. To this end, the scanning mirror 33 of the assembly 30 is moved with regard to FIG. 3a in such a manner that a laser beam 34 after having passed a scanning lens 35 provided for realizing a scanning mode is coupled into the deflection element 26 in such a manner that the laser beam is deflected into the region within the plate-like body 5.

As an alternative to the above described epi-fluorescence measurements with wide-field illumination also epi-fluorescence measurements with structured illumination and slit scan confocal measurements may be realized, wherein in both cases the beam path 24 is used. As a fourth alternative illumination mode confocal incident light laser scanning fluorescence measurements may be carried-out. To this end, the laser beam 34, as in the case of the above-described evanescent field illumination, likewise is coupled by means of the scanning lens 35 after having passed a two-dimensional beam deflection unit 36 ("scanning head"). The beam deflection unit 36 preferably is designed as described in DE 103 28 308 A1. Due to the two-dimensional movement of the beam deflection unit 36 the specimen (which is not shown in the Figures) can be scanned, wherein the light emitted by the specimen passes through the entire beam path in reverse fashion and is separated from the excitation beam after having passed the beam deflection unit 36.

If the beam path is designed in an appropriate manner, of course, further alternative optical elements or optical elements adjacent to the described assemblies, such as a spectrometer, may be provided at the surface of the body 5.

The benefits of a microscope device according to the invention reside in the flexibility of the microscope-platform concept, the compact structure of the setup, as can be seen, for example, in FIG. 3b, and the stability and vibration damping of the system. Vibrations resulting from fast movements are damped as fast as possible, and in addition the effect resulting from such vibrations is minimized by the fact that all components vibrate in phase.

According to a particularly preferred embodiment the plate-like body 5 is manufactured by casting (FIGS. 1a to 1c), or it comprises a cast base body 5 at which metal sheets are fixed (FIGS. 2a, 2b, 3a to 3c). This involves the benefit that, for example, materials particularly suitable for vibration damping, such as a mineral casting, may be utilized. Thereby a process for manufacturing a microscope device according to the invention can be used, wherein the openings in the plate-like body 5, which are illustrated in FIG. 1a by the reference signs 21a, 21b or 10, may be taken into account in a simple and cost-effective manner already during casting of the base body. For example, a corresponding opening in a plate-like body 5 may be kept free in a plate-like mould for the body 5 by inserting cylinder-like or cuboid-like elements into the mould, depending on the application of the microscope device. Thereby it is ensured that the microscope device can be quickly adapted to the customer's requirements without substantial structural changes being necessary. Additional subsequent machining steps, such as drilling or cutting of openings, are eliminated.

Whereas in an upright microscope focussing may also be achieved by moving the specimen relative to the objective, in an inverted microscope almost always focussing is achieved by moving the objective. Thus an inverted microscope according to the invention requires a focussing arrangement, which may be realized, for example, by utilizing an objective changeover unit and an objective lifting unit, such as described in WO 2004/077123 A2, wherein preferably instead of an objective turret a linear objective slider is used, as shown, for example, in FIG. 1c, in order to save space.

The lifting unit described in WO 2004/077123 A2 may be modified in the present case in such a manner that the asymmetric construction shown there is replaced by a centrally acting lifting unit which is essentially symmetric with regard to the optical axis of the microscope objective and which encompasses the deflection element (designated by the reference sign 11 in FIGS. 1a, 2a and 2b) used for coupling of the light. In the present case this is realized by locating the deflection element 11, due to the arrangement of the central optical axis with the tube lens 12 in the interior of the plate-like body 5, very close to the objective 1 (for an inverted microscope the objective points upwardly so that the deflection element 11 would be located below the objective 1, i.e. the representation of FIGS. 1a, 2a and 2b would have to be rotated by 180°). In this manner an extremely stiff lifting arm construction can be realized which is directly anchored within the plate-like body 5, whereby a focus adjustment is realized which is as stable as possible, and hence also is fast.

Such a deflection element is located, as already mentioned, immediately below the objective or, for an upright microscope, immediately above the objective, and hence relatively close to the objective pupil. If one realizes at this position a deflection element having a variable deflection angle rather than a fixed deflection angle, for example, by means of a galvanometer scanner, the illuminated and observed specimen field may be varied without influencing the pupil beam path too much. Otherwise, this could be achieved always only by means of an intermediate image which enables access to a plane conjugated with regard to the objective pupil. Hence, the described compact arrangement enables access to a plane close to the objective pupil for placement of a variable deflection element.

There are also situations conceivable in which one does without a deflection element close to the objective and in which rather the objective (or a series of objectives) is fixed at the front face (rather than at the top face or the lower face) of the microscope body 5 in a motor-driven slider. The other optical units need not be changed. With such an alternative objective arrangement the space below the objective becomes more freely accessible from several sides. This is beneficial, for example, for microscopy of large specimens, for example, entire animals, or if free access to the specimen is to be provided for complex electro-physiologic measurement setups. Like in the other cases shown it is an option to fix the manipulators directly at the microscope body 5 in order to ensure that the construction as a whole is as stiff as possible.

While various embodiments in accordance with the present invention have been shown and described, it is understood that the invention is not limited thereto and is susceptible to numerous to numerous changes and modifications as known to those skilled in the art. Therefore, this invention is not limited to the details and described therein, and includes all such changes and modifications as encompassed by the scope of the appended claims.

What is claimed is:

1. A microscope device comprising a microscope objective and a solid plate body limited by a flat top face and a flat lower face essentially parallel thereto, with the microscope objective being physically connected to the solid plate body, and with a portion of a beam path of the microscope device extending above and/or below the solid plate body, wherein another portion of the beam path of the microscope device extends, essentially parallel to the top face and the lower face, within a channel-shaped recess defined by internal wall surfaces of solid plate body.

2. The microscope device of claim 1, wherein said portion of the beam path of the microscope device extending above and/or below the solid plate body extends essentially parallel to the top face and the lower face.

3. The microscope device of claim 1, wherein beam deflection elements are provided in said recess and at said top face and said lower face in order to provide for a connection between said portion of the beam path extending within the solid plate body essentially parallel to the top face and the lower face and said portion of the beam path extending above and/or below the solid plate body.

4. The microscope device of claim 3, wherein at least one of said beam deflection elements is adjustable for selecting alternative light paths in the beam path of the microscope device.

5. The microscope device of claim 4, wherein said alternative light paths include at least one of coupling of illumination light from different light sources into the microscope objective and coupling of light from the microscope objective into different detectors.

6. The microscope device of claim 4, wherein said at least one adjustable beam deflection element is arranged in said portion of the beam path extending within said recess within the solid plate body essentially parallel to the top face and the lower face.

7. The microscope device of claim 1, wherein the microscope objective is arranged essentially perpendicular to said top face and said lower face, respectively.

8. The microscope device of claim 7, wherein the microscope objective is arranged above or below the solid plate body.

9. The microscope device of claim 8, wherein a tube lens is provided which is located in said recess in said portion of the beam path extending within the solid plate body essentially parallel to said top face and said lower face.

10. The microscope of claim 9, wherein a beam deflection element is provided between said tube lens and the microscope objective within said recess in said portion of the beam path extending within the solid plate body essentially parallel to the top face and the lower face.

11. The microscope device of claim 10, wherein said beam deflection element provided between said tube lens and the microscope objective is operable to control a deflection angle.

12. The microscope device of claim 10, wherein the microscope device is of an inverted microscope design, with said beam deflection element provided between said tube lens and the microscope objective and said beam deflection element being located below the microscope objective, and with a focusing arrangement being provided which is fixed at the solid plate body and acts centrally from below on the microscope objective and which encompasses said beam deflection element provided between said tube lens and the microscope objective.

13. The microscope device of claim 1, further comprising a first detector for detecting light collected by the microscope objective, said first detector being located within said recess in said portion of the beam path extending within the solid plate body essentially parallel to the top face and the lower face.

14. The microscope device of claim 13, comprising a second detector for detecting light collected by the microscope objective, said second detector being located in said portion of the beam path extending above or below the solid plate body or in an extension of said portion.

15. The microscope device of claim 14, wherein said portion of the beam path extending above or below the solid plate body comprises light from an epi-illumination light source.

16. The microscope device of claim 15, wherein said portion of the beam path comprising light from the epi-illumination light source and the portion of the beam path supplying light to the second detector from the microscope objective are located opposite to each other in planes which are parallel to said top face and said lower face.

17. The microscope of claim 14, wherein said portion of the beam path comprising light from an epi-illumination light source and the portion of the beam path supplying light to the second detector from the microscope objective are located opposite to each other and symmetric with regard to said portion of the beam path extending within the solid plate body essentially parallel to said top face and said lower face.

18. The microscope device of claim 1, comprising a first detector for detecting light collected by the microscope objective, said first detector provided at one of the faces of the solid plate body in an extension of said portion of the beam path extending within said recess within the solid plate body essentially parallel to the top face and the lower face.

19. The microscope device of claim 1, wherein a selective beam deflection element is arranged within said recess in said portion of the beam path extending within said recess within the solid plate body essentially parallel to said top face and said lower face, said beam deflection element being adapted to deflect illumination light towards the microscope objective and to transmit light collected by the microscope objective.

20. The microscope device of claim 19, wherein said selective beam deflection element located within the said recess is dichroic.

21. The microscope device of claim 20, wherein said portion of the beam path extending above or below the plate-like body comprises light from an epi-illumination light source, which light is deflected, by means of a beam deflection element located above or below, respectively, the solid plate body, from that portion of the beam path through an opening of the plate-like body extending essentially perpendicular to the top face and the lower face, respectively, onto said dichroitic beam deflection element located within said recess, by which said light is coupled into said portion of the beam path extending within said recess essentially parallel to the top face and the lower face of the solid plate body.

22. The microscope device of claim 21, wherein a tube lens is arranged between said beam deflection element located above or below the solid plate body and said dichroitic beam deflection element located within said recess.

23. The microscope device of claim 1, wherein a selective beam deflection element is located within said recess in said portion of the beam path extending within said recess within the solid plate body essentially parallel to the top face and the lower face, said deflection element being adapted to transmit illumination light towards the microscope objective and to deflect light collected by the microscope objective.

24. The microscope device according to claim 1, wherein a further portion of the beam path of the microscope extends in a further recess within the solid plate body essentially parallel to the top face and the lower face.

25. The microscope device of claim 24, wherein said further portion of the beam path is arranged at an angle with regard to said portion of the beam path extending within the solid plate body essentially parallel to the top face and the lower face.

26. The microscope device of claim 1, wherein said solid plate body comprises at least one recess for a portion of the beam path running essentially perpendicular to the top face and the lower face of the solid plate body.

27. The microscope device of claim 1, wherein said plate-like body is designed as a cuboid-like plate having two parallel plate-surfaces.

28. The microscope device of claim 27, wherein the two plate-surfaces of the solid plate body are formed by metal sheets between which a base body is arranged.

29. The microscope device of claim 28, wherein said recess is formed in the base body.

30. The microscope device of claim 29, wherein the base body is a casting body.

31. The microscope device of claim 30, wherein the base body is a mineral casting body.

32. A method for manufacturing a microscope device according to claim 30, wherein at least one recess for the portions of the beam path running within the solid plate body is cast around when casting the base body.

* * * * *